United States Patent [19]

Beck

[11] Patent Number: 5,409,335
[45] Date of Patent: Apr. 25, 1995

[54] TIE-DOWN ANCHORING DEVICE

[76] Inventor: George R. Beck, 7 Bridle La., Rancho Palos Verdes, Calif. 90274

[21] Appl. No.: 222,246

[22] Filed: Apr. 4, 1994

[51] Int. Cl.6 .............................................. B60P 7/08
[52] U.S. Cl. ................................... 410/105; 410/104
[58] Field of Search ...................................... 410/8–12, 410/74, 75, 101, 104, 105, 106, 108, 115; 248/499, 500, 503, 505; 24/265 CD, 115 K

[56] References Cited

U.S. PATENT DOCUMENTS

| | | | |
|---|---|---|---|
| 4,688,843 | 8/1987 | Hall | 410/8 X |
| 4,850,769 | 7/1989 | Matthews | 410/105 |
| 4,867,623 | 9/1989 | Loyd | 248/500 X |
| 5,259,711 | 11/1993 | Beck | 410/104 |

FOREIGN PATENT DOCUMENTS 787750 12/1957 United Kingdom ................ 410/105

Primary Examiner—Michael S. Huppert
Assistant Examiner—Stephen Gordon
Attorney, Agent, or Firm—Roger A. Marrs

[57] ABSTRACT

An anchoring device is disclosed herein having a track with a plurality of spaced-apart lock cut-out receptacles formed in an inverted T-groove insertably accepting a movable slider or car. The slider or car includes an eyelet member with a flange slideably carried in the T-groove and a spring-biased latch element having a circular stop normally biased into a lock position in a selected cut-out receptacle in the track. The latch is downwardly depressible against the spring bias to an unlock position with the track cut-out receptacle to permit movement of the slider along the track. Track sections are joined together by an expansion pin and slot construction.

2 Claims, 1 Drawing Sheet

U.S. Patent   Apr. 25, 1995   5,409,335
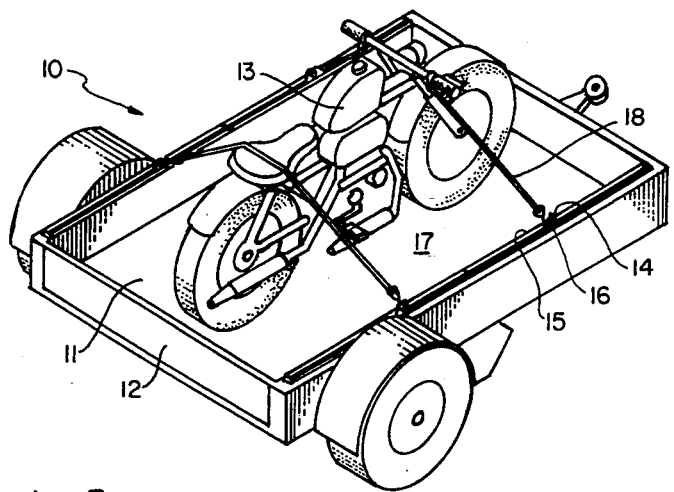
FIG. 1.
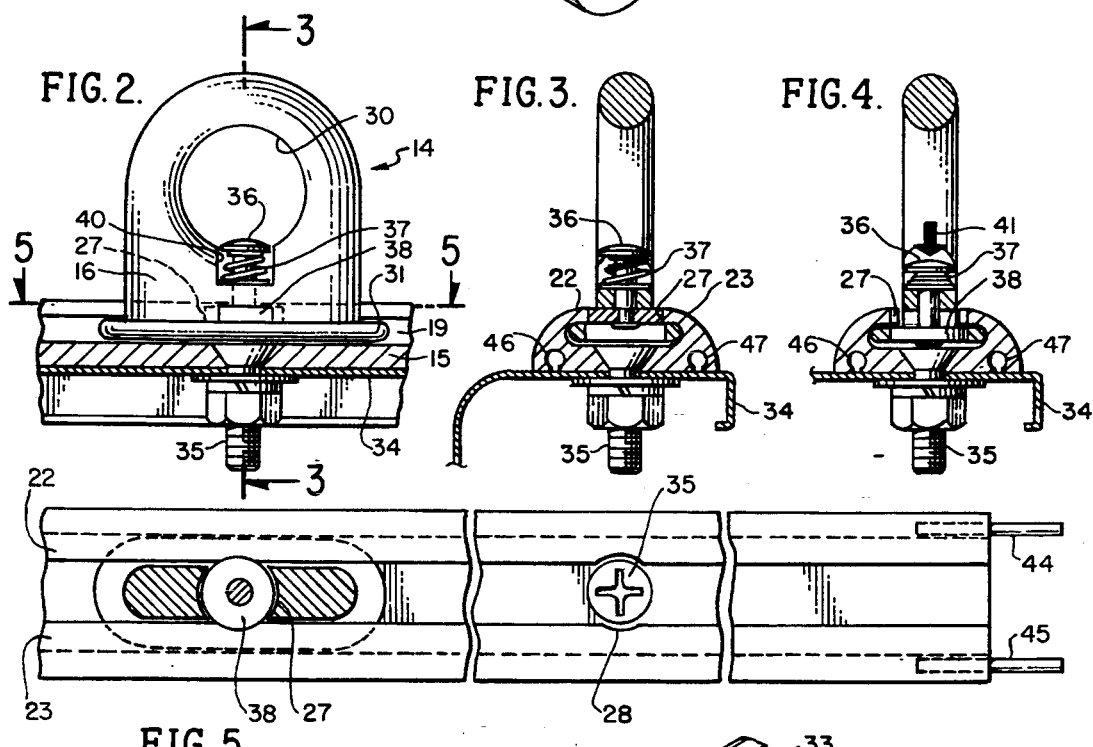

TIE-DOWN ANCHORING DEVICE

BACKGROUND OF THE INVENTION

1. Field of the Invention

The present invention relates to the field of anchoring devices, and more particularly to a novel tie-down apparatus having a track arrangement with a slideable car carried thereon for securement to a trailer or truck bed rail. The car includes an operation latch for selectively securing the car in position on the track.

2. Brief Description of the Prior Art

Conventionally, a wide variety of rings, bars and the like have been provided for retaining the free end of a rope, strap, chain or other securement means along the length of a rail. Such a device usually includes a movable car which slides along the track and, in some instances, a plunger is employed which, when aligned with an aperture in the track, permits latching so that the car is retained at that particular place. A typical example resides in the disclosure of U.S. Pat. Nos. 4,850,769 and 5,259,711.

However, problems and difficulties have been encountered when employing such a car and track arrangement, which stem largely from the fact that the track itself is of a single or unitary construction not permitting fastening means to be selectively located along the track's length in order to secure the track to a supporting member, such as a truck or trailer siderail. Usually, holes are provided in the single track through which bolts are passed in order to engage with the supporting structure; however, no provision is made for aligning the securement fasteners at selected anchor positions along its length which would be more suitable than the hole location arranged in fixed spaced-apart relationship along the length of the conventional single track.

Furthermore, the usual latches employed for releasably securing the car to the track sometimes give way and release due to inadvertent shifting of the load which is tied down when the securement straps move, jiggle or become stretched. Also, when changing cargo configurations, oftentimes there is no hook or attached point for securing the cargo. In other instances, the mechanisms are complex and the tracks are not of variable length.

Therefore, a long-standing need has existed to provide a novel tie-down system or apparatus which employs a sliding lock anchor which engages in a track at selective anchoring points, and which allows complete flexibility in accommodating all cargo configurations. Such accommodation includes not only positioning of the car along the track, but in providing selective anchoring points on the track for securement to a support member, such as a siderail or a trailer or truck bed.

SUMMARY OF THE INVENTION

Accordingly, the above problems and difficulties are obviated by the present invention which provides a novel tie-down anchoring system employing a single grooved track having a sliding car movably carried thereon and having a latch mechanism for releasably engaging with selective ones of spaced-apart notches formed in the grooved track. The track includes several sections which may be joined in an end-to-end relationship by expansion pins to provide for variable length.

A feature resides in the fact that the car includes an integral fixed ring to which a load may be attached and further includes a spring-biased plunger in the latch mechanism which in the one position prevents release of the car from the track while when in a second position, permits release of the car from the track.

Another object of the present invention provides for a tie-down apparatus having the ability to accommodate a variety of cargo configurations such that the anchoring means may be specifically located to desired locations along the track as well as having a release mechanism on a car slideably carried on the track which may be placed under load.

Another object of the present invention is to provide a novel and inexpensive anchoring means for securing cargo of various configurations to a trailer or truck siderail that includes a single grooved track for slideably mounting a movable car having a release mechanism and an integral eyelet attachment means.

Yet another object of the present invention is to provide a novel tie-down system incorporating a novel latch mechanism for a slideable car which includes a spring-tensioned plunger prevented from movement when in one position and wherein the plunger is in a release position when in another or second position.

Another object is to provide a unique device having a spring-biased plunger carried on a sliding car which adds locking security to the total mechanism.

A further object resides in providing a complete cargo restraint system which is not only ideal for pickup trucks, but adds load flexibility and cargo security to trailers, vans, trucks, or any type of cargo platform.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view showing the novel tie-down apparatus in a typical operational position for holding cargo to a trailer bed;

FIG. 2 is a side elevational view, partly in section, showing the respective components of the tie-down apparatus used in FIG. 1;

FIG. 3 is a transverse cross-sectional view of the tie-down apparatus showing the sliding car in a locked position on the single track as taken in the direction of arrows 3—3 of FIG. 2;

FIG. 4 is a transverse cross-sectional view of the tie-down apparatus as taken in the direction of arrows 3—3 of FIG. 2 illustrating the latch in a second position permitting release of the car for sliding the car along the track;

FIG. 5 is a sectional view of the single groove track showing the track arrangement with spaced-apart lock notches or cut-outs; and FIG. 6 is a perspective exploded view of adjacent track member ends joined by expansion pins.

DESCRIPTION OF THE PREFERRED EMBODIMENT

Referring to FIG. 1, a conventional trailer is illustrated in the general direction of arrow 10 which includes a cargo bed 11 having continuous sidewalls terminating in a door 12 shown in an up position. The continuous sidewalls of the bed 11 define a storage compartment or cavity in which boxes, parcels or odd shaped cargo and the like may be stored. In the present instance, numeral 13 indicates a motorcycle which is of irregular configuration, and the motorcycle as cargo is positioned within the compartment for transport. The motorcycle is intended to be transported in the trailer from one place to another. During such transport, the motorcycle 13 will generally move about in the compartment, which is undesirable. Therefore, a means is required for releasably holding or tying the motorcycle to the truck bed or other support medium, such as the sidewalls of the compartment, so as to inhibit the undesired movement.

The novel tie-down apparatus or device of the present invention is employed in combination with the trailer bed 11 for such a purpose. Other applications and usages may be employed without departing from the inventive concept and such other applications may include a tie-down for block and tackle purposes in connection with other vehicles, such as boats, trucks or the like.

In general, numeral 14 illustrates the tie-down means of the present invention which includes an elongated length of single track 15 on which a car 16 is slideably carried. The single track 15 is retained on supporting structure, such as the top of the sidewall of the trailer bed 11, by selective anchoring means to be described later. It is important to note that the single track 15 may also be carried on the floor 17 of the bed 11 so that the track may be placed in a more suitable position to tie down cargo of other configurations. In the present instance, the motorcycle 13 is secured to the single tracks located on opposite sides of the truck bed by means of straps, such as strap 18 having its opposite ends detachably secured to the motorcycle itself and the car 16 of the tie-down apparatus.

Referring now in detail to FIGS. 2 and 3, an enlarged side elevational view and sectional view is provided illustrating the tie-down apparatus 14 and its primary components being the single track 15 and the sliding car 16. The track 15 is an elongated length of track having an inverted T-shaped groove 19. The guide portion of the track is defined by opposing side rails 22 and 23. It is also noted that the opposing rails 22 and 23 are provided with a plurality of spaced-apart notches 27 and 28, as shown in FIG. 5, which are spaced along the length of the track 15.

Continuing with the descriptions of FIGS. 2 and 3, it can be seen that the slider or car 16 includes an eyelet 30 to which cords, straps, hooks or other hold-down medium may be attached. The car further includes a flange 31 on which the eyelet 30 is integrally carried and the flange 31 is slideably disposed within the inverted T-shaped groove 19. The groove 19 includes a horizontal portion in which the flange 31 slides in a horizontal manner, while the body of the car 16 passes through a vertical slot portion in communication with the horizontal groove 19. The horizontal and vertical portions of the slot or groove 19 are more clearly illustrated in FIG. 6 wherein numeral 32 pertains to the horizontal slot while numeral 33 pertains to the vertical slot. The vertical slot is defined between the opposing sidewalls 22 and 23 respectively.

The track 15 is attached to the top of the trailer sidewall, indicated by numeral 34, by means of a conventional nut and bolt fastener 35. The head of the bolt is countersunk into the track 15 so that the slot or groove 19 is completely flush, permitting the flange 31 of the car 16 to slide therethrough. The opposing sidewalls 22 and 23 of the track overlap the side edge marginal regions of the flange 31, as shown in FIGS. 3 and 4, to prevent dislodgement of the car or slider 16 from the track. Therefore, the car may slide longitudinally along the length of the track and will be kept in the sliding relationship by means of the opposing sidewalls 22 and 23. The car can be removed from the track by moving the car to the extreme end of the track where an opening is provided for car removal.

Referring now to FIGS. 2 and 3, it can be seen that the car includes a latch mechanism comprising a plunger 36 which is biased by spring 37 to place a circular stop or element 38 into the lock cut-out 27. The spring 37 is expandable between the underside of the plunger top 36 and the bottom of a recess 40 in which the plunger is slideably disposed. Therefore, in FIG. 3, it can be seen that the stop element 38 is in the lock position with respect to notch 27 while in FIG. 4, the plunger has been depressed in the direction of arrow 41 so that the stop or lock element 38 is taken out of the notch 27 so as to permit the car to be moved along the length of the track.

Referring now to FIG. 6, it can be seen that the track 15 may include several sections, such as sections 42 and 43, having adjacent ends joined together by means of expansion pins 44 and 45. Such pins are known as spring pins since they are slotted and can be compressed in order to form an interference fit when forced into receiving openings such as identified by numerals 46 and 47. Therefore, the track members may be readily placed into a storage box for shipment or for storage on the shelf in a store. A desired length can then be assembled by placing the expansion or spring pins 44 and 45 into the respective and mating openings 46 and 47 located at the ends of each of the respective track sections. By forcing the pins into the openings, a firm and rigid joint is produced and an elongated track of multiple sections is provided.

In view of the foregoing, it can be seen that an adjustable tie-down system is provided for use in connection with trucks, trailers or vans. The inventive system employs a sliding car 16 which utilizes the spring action of plunger 36 to lock and unlock the car in a selected position along the length of the track 15 by selectively engaging the stop element 38 with a selected one of the lock cut-outs 27, 28 or any other lock cut-out provided along the length of the inverted T-shaped groove 19. This allows for complete flexibility on all cargo configurations and presents suitable adjustments at tie-down points along the track. The inventive concept features smooth sliding lock mechanisms in order to replace old-fashioned hooks and rings. The unique concept allows the user to change cargo configurations and also have a tie-down point available where it is most needed.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tie-down apparatus comprising:
   an elongated track having an inverted T-shaped groove along the top of said track;

a car slideably disposed on said track and having a flange disposed in said groove with an eyelet projecting through said groove exteriorly of said track;

said track groove defined between opposing spaced-apart parallel sidewalls accommodating said car eyelet with said car flange disposed underneath said sidewalls to retain said car in said groove;

a latch mechanism operably carried on said car for selectively locking and unlocking said car with said track;

said latch mechanism having a spring-biased plunger with an enlargement at one end thereof and a lock element a distal end;

said track groove having a plurality of spaced-apart lock cut-outs provided in said track sidewalls for insertably receiving said lock element; and said latch mechanism being in a lock position when said lock element resides in a selected one of said lock cut-outs and being in an unlocked position when said lock element resides in said groove.

2. The invention as defined in claim 1 wherein:

said track comprises a plurality of track segments;

each track segment having opposite ends;

each track segment having an undersurface provided with parallel spaced-apart slots;

a pair of expansion pins insertable in said slots to provide an interference fit to join said track segments together in a unitary construction.

* * * * *